(12) United States Patent
Xia

(10) Patent No.: US 10,901,468 B2
(45) Date of Patent: Jan. 26, 2021

(54) ELECTRONIC DEVICE

(71) Applicant: Lenovo (Beijing) Co., Ltd., Beijing (CN)

(72) Inventor: Xiaosong Xia, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/457,474

(22) Filed: Jun. 28, 2019

(65) Prior Publication Data

US 2020/0004300 A1    Jan. 2, 2020

(30) Foreign Application Priority Data

Jun. 29, 2018   (CN) .......................... 2018 1 0694973

(51) Int. Cl.
  *G06F 1/16*     (2006.01)
  *E05D 3/12*     (2006.01)
  *E05D 11/00*    (2006.01)

(52) U.S. Cl.
  CPC .............. *G06F 1/1683* (2013.01); *E05D 3/12* (2013.01); *E05D 11/0081* (2013.01); *G06F 1/1616* (2013.01); *G06F 1/1688* (2013.01); *E05Y 2900/606* (2013.01)

(58) Field of Classification Search
  None
  See application file for complete search history.

(56) References Cited

U.S. PATENT DOCUMENTS

| | | | | |
|---|---|---|---|---|
| 5,216,578 A | * | 6/1993 | Zenitani | H05K 7/1435 211/41.17 |
| 5,719,799 A | * | 2/1998 | Isashi | G06F 1/1618 345/169 |
| 7,023,704 B1 | * | 4/2006 | Zarnowitz | H05K 7/1409 361/754 |
| 7,614,891 B2 | * | 11/2009 | Yu | G06K 13/0806 439/159 |
| 7,692,919 B2 | * | 4/2010 | Liang | G06F 1/1616 361/679.29 |
| 9,590,368 B2 | * | 3/2017 | Wyckoff | H04B 1/38 |
| 9,864,435 B2 | * | 1/2018 | Okuley | H04N 13/254 |
| 10,401,926 B1 | * | 9/2019 | North | G06F 1/1616 |
| 10,496,808 B2 | * | 12/2019 | Van Os | G06Q 20/206 |
| 2009/0067125 A1 | * | 3/2009 | Xia | G06F 1/1637 361/679.27 |
| 2009/0310292 A1 | * | 12/2009 | Tian | G06F 1/1654 361/679.29 |

(Continued)

*Primary Examiner* — Courtney L Smith
*Assistant Examiner* — Rashen E Morrison
(74) *Attorney, Agent, or Firm* — Anova Law Group, PLLC

(57) ABSTRACT

The present disclosure provides an electronic device. The electronic device includes a first main body including a first side portion; a connecting device connected to the first side portion of the first main body; a second main body including a second side portion coupled to the first side portion, the second side portion is connected to the connecting device such that the second main body is movable relative to the first main body to form a first angle between the first main body and the second main body or a second angle different from the first angle; and a first multimedia output module disposed on the connecting device and communicatively connected to the first main body or the second main body.

10 Claims, 9 Drawing Sheets

(56) References Cited

U.S. PATENT DOCUMENTS

| | | | |
|---|---|---|---|
| 2010/0172081 A1* | 7/2010 | Tian | G06F 1/1632 361/679.29 |
| 2011/0280428 A1* | 11/2011 | Tseng | H04R 1/2811 381/332 |
| 2012/0236490 A1* | 9/2012 | Xia | G06F 1/187 361/679.33 |
| 2012/0236492 A1* | 9/2012 | Wallace | E05B 13/002 361/679.37 |
| 2016/0327986 A1* | 11/2016 | Farahani | G06F 1/1662 |

* cited by examiner

ELECTRONIC DEVICE

CROSS-REFERENCES TO RELATED APPLICATION

This application claims priority to Chinese Patent Application No. 201810694973.8, entitled "Electronic Device" filed on Jun. 29, 2018, the entire content of which is incorporated herein by reference.

FIELD OF TECHNOLOGY

The present disclosure relates to the field of electronic device technology, and more specifically to an electronic device.

BACKGROUND

For an electronic device that may be opened and closed, such as a laptop or a mobile phone, a screen portion that may be flipped relative to a main body portion may be pivotally connected to the main body portion through a rotary shaft mechanism.

Although there are many structures of the rotary shaft mechanism in the convention technology, the conventional rotary mechanism may only play the role of rotatably connection the screen portion and the main body portion of the electronic device.

As such, the function of the connection mechanism is relatively limited.

BRIEF SUMMARY OF THE DISCLOSURE

An aspect of the present disclosure provides an electronic device. The electronic device includes a first main body including a first side portion; a connecting device connected to the first side portion of the first main body; a second main body including a second side portion coupled to the first side portion, the second side portion is connected to the connecting device such that the second main body is movable relative to the first main body to form a first angle between the first main body and the second main body or a second angle different from the first angle; and a first multimedia output module disposed on the connecting device and communicatively connected to the first main body or the second main body.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

Figure 1:
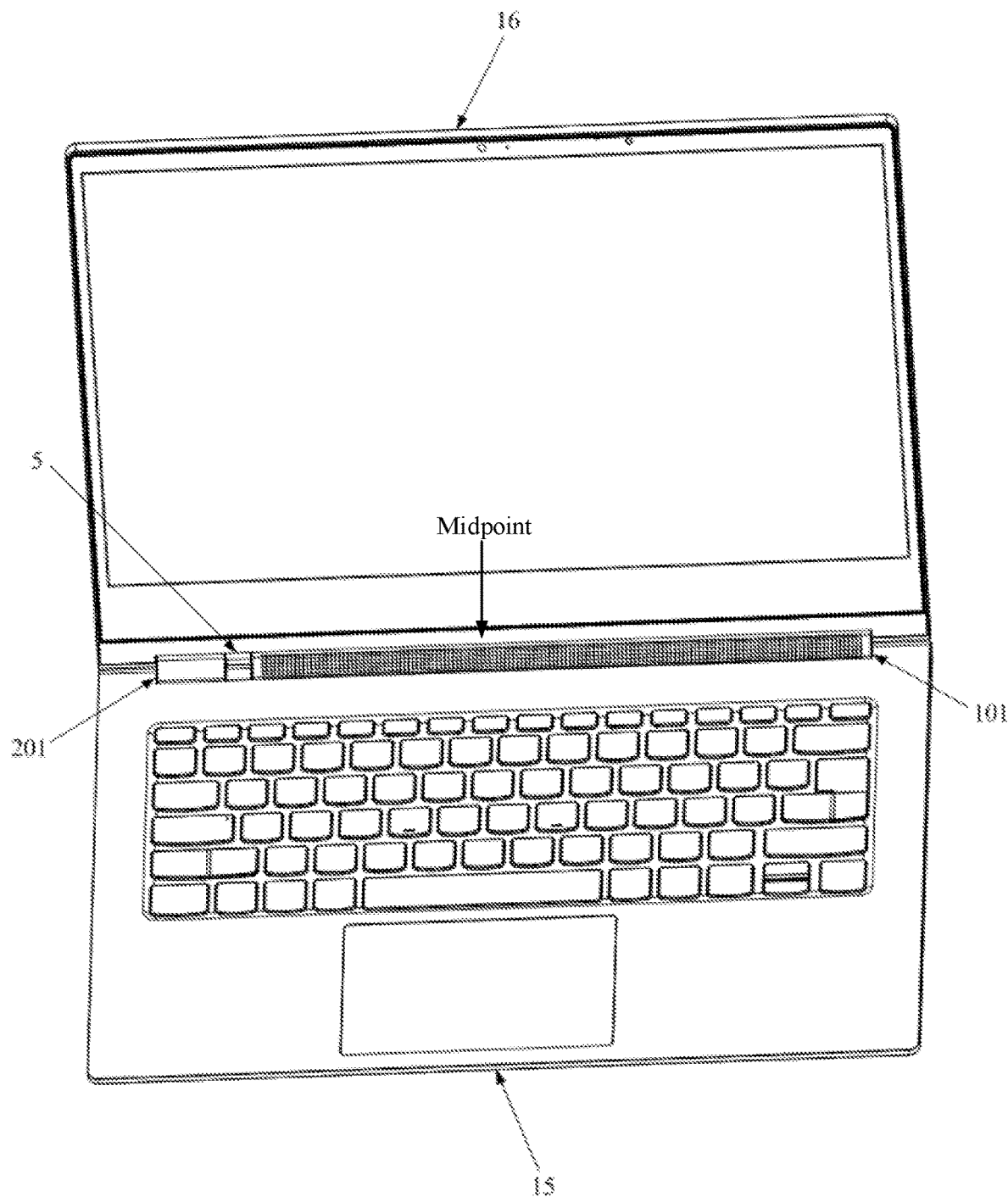
FIG. 1 is a schematic diagram of the appearance of an electronic device according to an embodiment of the present disclosure.

It should be noted that the reference numerals shown in the drawings are described as follows:
First rotary shaft mechanism 1
Second rotary shaft mechanism 2
First multimedia output module 3
Opening 4
Connecting module 5
First wire 6
Second wire 7
Wire inlet channel 8
Connecting channel 9
Wire outlet channel 10
Retaining ring 11
Elastic sleeve 12
Connecting plate
First main body 15
Second main body 16
First housing 101
Second housing 201
First connector 501
Second connector 502
First support 503
Second support 504
First protrusion 505
Second protrusion 506

DETAILED DESCRIPTION

The present disclosure provides an electronic device, which includes a rotary shaft mechanism with additional functions.

Hereinafter, aspects, features, and embodiments of the present disclosure will be described with reference to the accompanying drawings. It should be understood that such description is illustrative only but is not intended to limit the scope of the present disclosure. In addition, it will be understood by those skilled in the art that various modifications in form and details may be made therein without departing from the spirit and scope of the present disclosure.

As shown in FIG. 1 to FIG. 9, an embodiment of the present disclosure provides an electronic device. The electronic device includes a first main body 15, a second main body 16, and a connecting device. The first main body 15 may include a first side portion that may be connected to the connecting device, and the second main body may include a second side portion that may be connected to the connecting device. When the connecting device is connected to the first side portion and the second side portion, the connection of the first main body 15 and the second main body 16 may be achieved, and the first main body 15 and the second main body 16 connected through the connecting device may move relative to each other. The movement between the first main body 15 and the second main body 16 may create at least a first angle and a second angle, where the first angle may be different from the second angle. That is, the connection through the connecting device allows at least the first main body 15 and the second main body 16 to rotate relative to each other to adjust the angle between the first main body 15 and the second main body 16. Further, the connecting device may be asymmetrically arranged with respect to a midpoint of the first side portion or the second side portion, and the connecting device may further include a first multimedia output module, which may work with the first main body 15 and the second main body 16 to output multimedia information to be perceived by a user. As such, the functions of the connecting device may be more diversified, and the performance of the electronic device may be enhanced.

As shown in FIG. 1, the electronic device provided in the embodiment may include a plate-like shaped first main body 15 with opposite first and second surfaces, and a first side portion that may be a side region of the plate-like shaped first main body 15. The electronic device may also include a plate-like shaped second main body 16 with opposite third and fourth surfaces, and a second side portion that may be a side region of the plate-like shaped second main body 16. The first angle or the second angle may be an angle between a first reference surface and a second reference surface. The first reference surface may be a plane between the first surface and the second surface (including a plane where the first surface and the second surface may be located), and the second reference surface may be a plane between the third surface and the fourth surface (including a plane where the third surface and the fourth surface may be located). For example, the electronic device of the present embodiment may be a laptop, where the first main body 15 may be the main body portion of the laptop, and the second main body 16 may be the screen portion of the laptop. Of course, the electronic device of the structure mentioned above may also be other devices, such as a flip phone or the like.

In the above embodiment, the first surface and the second surface may respectively refer to the two surfaces having the largest area on the plate-like shaped first main body 15. Similarly, the third surface and the fourth surface may respectively refer to the two surfaces having the largest area on the plate-like shaped second main body 16. These surfaces may be uneven surfaces, but they can be considered flat. The surfaces being considered as flat surfaces may be an average surfaces of the uneven surfaces (i.e., the surface at which the midpoint between the highest point and the lowest point on the uneven surface is located), or may be a parallel surface of the average surface, or a surface on which a large flat portion area may be located on the uneven surface. Further, if the first, second, third, and fourth surfaces are being considered as flat surfaces, the first reference surface may be one of the first surface or the second surface, and the second reference surface may be one of the third surface or the fourth surface. Or, the first reference surface may be set to be the average surface, parallel surface, or the like mentioned above.

The relative movement of the first main body 15 and the second main body 16 may include the relative rotation between the first main body 15 and the second main body 16 through the connecting device. That is, the electronic device may be in two or more of the following positions through the connection of the connecting device:

The second surface may be opposite to the third surface, and the angle between the second surface and the third surface may be less than a first threshold, which may be 10°. When the electronic device is a laptop, this position may be a closed position of the laptop.

The first surface and the fourth surface may be opposite to each other, and the angle between the first surface and the fourth surface may be less than the first threshold. When the electronic device is a laptop, at this time the laptop may be in a position in which the main body portion and the screen portion may be back to back, that is, a tablet position.

The first surface and the fourth surface may be opposite to each other, and the angle between the first surface and the fourth surface may be greater than the first threshold and less than a second threshold, which may be 90°. When the electronic device is a laptop, the angle of the screen portion of the laptop may be 90° to 350° with respect to the main body portion. When the laptop in this position is placed on a desktop, the laptop may be in a standing position, which may be similar of the shape of a tent, and the screen may be on the outer side.

The angle between the second surface and the third surface may be greater than the second threshold and less than a third threshold, which may be 180°. When the electronic device is a laptop, the angle of the screen portion of the laptop may be 90° to 180° with respect to the main body portion. When the laptop in this position is placed on a desktop, and the main body portion is place on the desktop, the screen portion may be in an inclined position for the human eyes to view, and the laptop may operate in a normal laptop position, as shown in FIG. 1.

As can be seen from the various positions mentioned above, when the electronic device is a laptop, a 360° rotation may be achieved between the screen portion and the main body portion of the laptop. Since the 360° rotating laptop may include the various working positions mentioned above, it may satisfy more diverse use requirements of a user. In one embodiment, the electronic device of the present embodiment may be a laptop that may achieve 360° rotation.

In addition, since the relative movement of the first main body 15 and the second main body 16 may place the electronic device in two or more positions mentioned above, the electronic device of the present embodiment may have only some of the positions mentioned above. For example, the electronic device may only have the closed position and the normal laptop position. When the electronic device is a laptop having only the closed position and the normal laptop position, the laptop can be a non-360° rotating laptop.

In addition to the positions mentioned above, the electronic device may not be a laptop. For example, the first main body 15 and the second main body 16 may both be display screens, that is, the electronic device may be a device for rotating and connecting two display screens through the connecting device.

In the present embodiment, when the connecting device is disposed on the first side and the second side, under the premise of asymmetric setting, there are several options to arrange the connecting device, for example:

The connecting device as a whole may be disposed offset from the midpoint of the first side or the second side. For example, the connecting device may be located on one side of the midpoint, or it may be understood that the symmetrical center point between the functional mechanisms constituting the connecting device may not be the midpoint of the first side or the second side, or the functional mechanisms may be asymmetrical about any point. That is, regardless of the arrangement of the various functional mechanisms constituting the connecting device, the connecting device may appear to be asymmetrical as a whole.

Alternatively, the connecting device as a whole may be symmetrically disposed about the midpoint of the first side or the second side, and the functional mechanisms constituting the connecting device may be asymmetrically arranged with respect to the midpoint. That is, different functional mechanisms may be located on both sides of the midpoint, and their distances from the midpoint may be different.

The arrangement methods of the connecting device mentioned above are all asymmetric arrangement of the connecting device to ensure smooth rotation between the first main body 15 and the second main body 16. However, based on the consideration of better integration with other components, in one embodiment, the second arrangement method may be selected. That is, the connecting device as a whole may be symmetrically disposed about the midpoint, but the functional mechanisms may be asymmetrically arranged.

In addition, the asymmetric arrangement method mentioned above may include various type of asymmetry. For example, it may only be the asymmetry of the position of the same components (e.g., an arrangement method of AB-AB, in the "AB-AB" arrangement method, the "-" may be understood as a symmetrical focus, and A and B may respectively refer to different ends of the same component or different components), or the mirror symmetry of the same components (e.g., an arrangement method of AB-BA), or the mirror symmetry of all the details and structures (e.g., the arrangement method of AB-BA), and so on.

At the same time, the asymmetry described above is mainly embodied on the exposed components of the functional mechanisms, such as the exposed housings, exposed electronic components, etc. The invisible structural components (such as wiring channels, rotary shafts, etc.) and electronic device (such as antennas, data lines, etc.) disposed inside the housing may be asymmetrically arranged or symmetrically arranged.

In the present disclosure, the asymmetric arrangement may refer to a macroscopic arrangement of structures, devices, and the like on the appearance of an electronic device. That is, an arrangement method that may be directly perceived by a general user. Some asymmetric arrangement of the details of the connecting device, such as the asymmetric arrangement of the lines on the housing, the uneven distribution of a small number of identical structures (e.g., small holes), the improvement of offsetting the device by a few millimeters, may not be within the scope of the asymmetric arrangement described herein.

As shown in FIG. 3 to FIG. 6, the connecting device may include a rotary shaft module. Since the connecting device may adopt an asymmetric arrangement method, the rotary shaft module may have an additional installation space. As such, other modules that may be integrated into the electronic device may be disposed on the rotary shaft module, such as a first multimedia output module 3, to further improve the working performance of the electronic device and make full use of the installation space.

Figure 2:
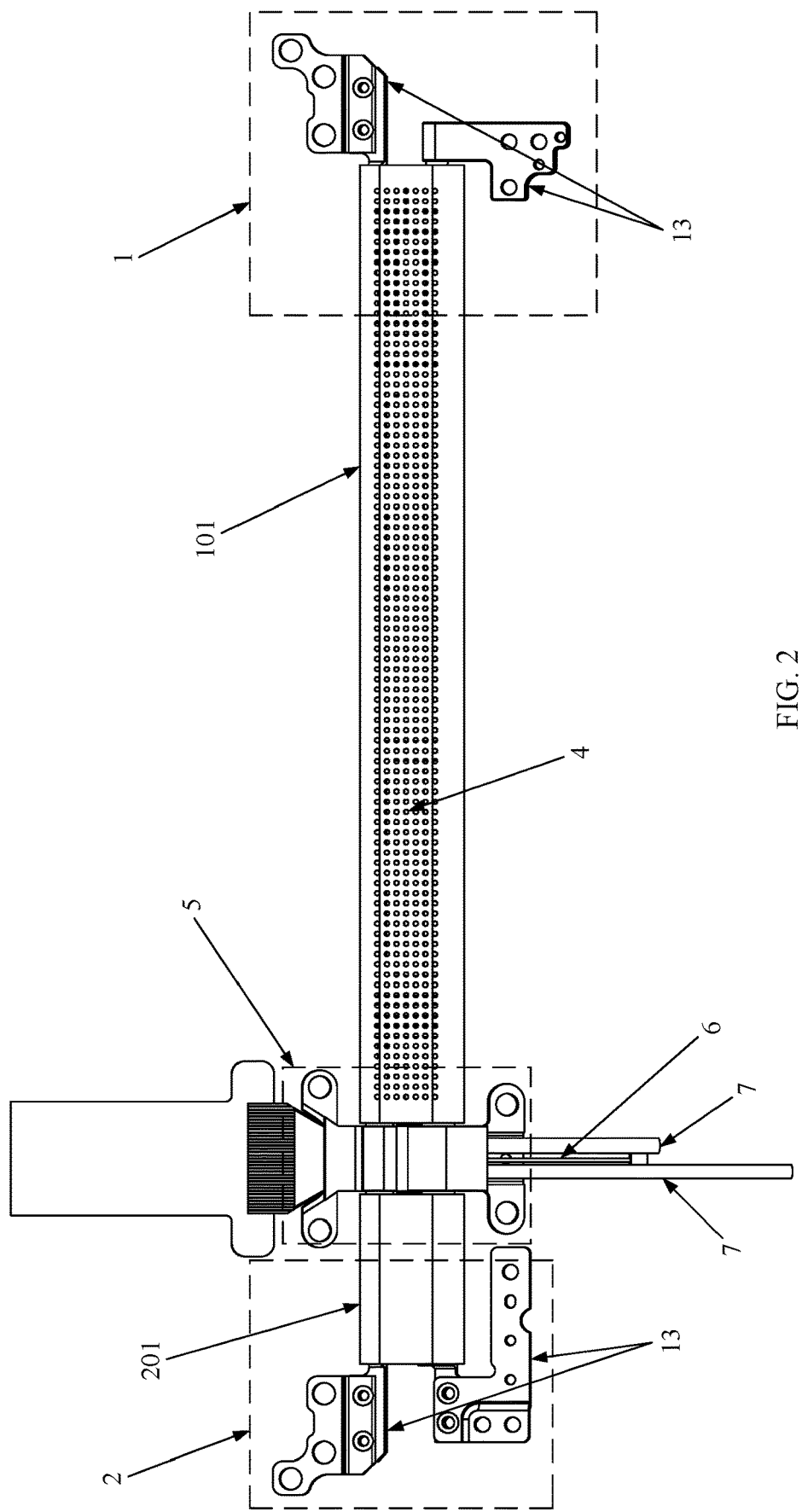
FIG. 2 is a schematic structural view of a connecting device according to an embodiment of the present disclosure.
Figure 5:
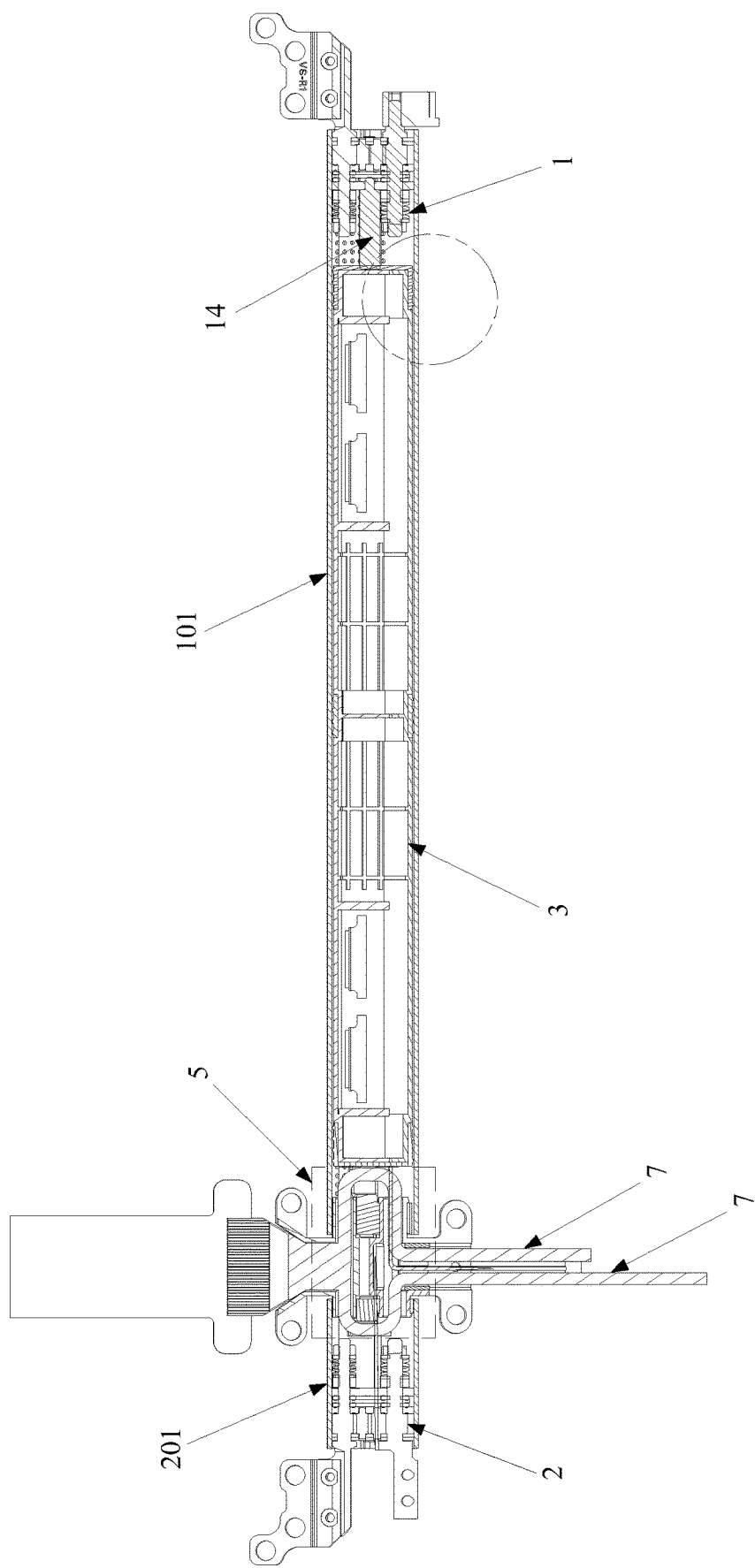
FIG. 5 is a cross-section view of FIG. 2.

There are various arrangement methods of the first multimedia output module 3. In one embodiment, the first multimedia output module 3 may be disposed in an inner cavity of a housing of the rotary shaft module, and the housing may include an opening 7 to communicate with the inner cavity. As such, media information outputted by the first multimedia output module 3 may be perceived outside the housing, as shown in FIG. 1, FIG. 2, and FIG. 5. In one embodiment, the first multimedia output module 3 may be disposed in the inner cavity of the housing because the inner cavity of the housing has a large space for installation so the installation space may be fully utilized. Further, the cover of the housing may provide protection to the first multimedia output module 3 and improve the appearance of the electronic device, hence, this arrangement may be selected. Since the media information outputted by the first multimedia output module 3 needs to be perceived by the user, in order to ensure normal operation, the opening 7 may be disposed on the housing opened in the housing, so that the media information outputted by the first multimedia output module 3 may be perceived by the user outside the housing through the opening 7.

In one embodiment, the first multimedia output module 3 may be an audio output module communicatively connected to the first main body 15 (when the electronic device is a laptop, the first main body 15 may be the main body portion), and more specifically, the first multimedia output module 3 may be a speaker for improving the acoustics of the electronic device. The opening 7 may be a plurality of sound holes. In order to obtain a better aesthetic effect, the sound holes may be arranged in a matrix, and a distribution area of all the sound holes on the housing may be larger than the area of the housing corresponding to the speaker.

In addition, the first multimedia output module 3 may be a display screen communicatively connected to the second main body 16 (when the electronic device is a laptop, the second main body 16 may be the screen portion) to expand the display area of the electronic device. The opening 7 may be a window for the user to view the display interface. Of course, the display screen may also not be disposed on the inside of the housing, but on the outer surface of the housing.

Figure 6:
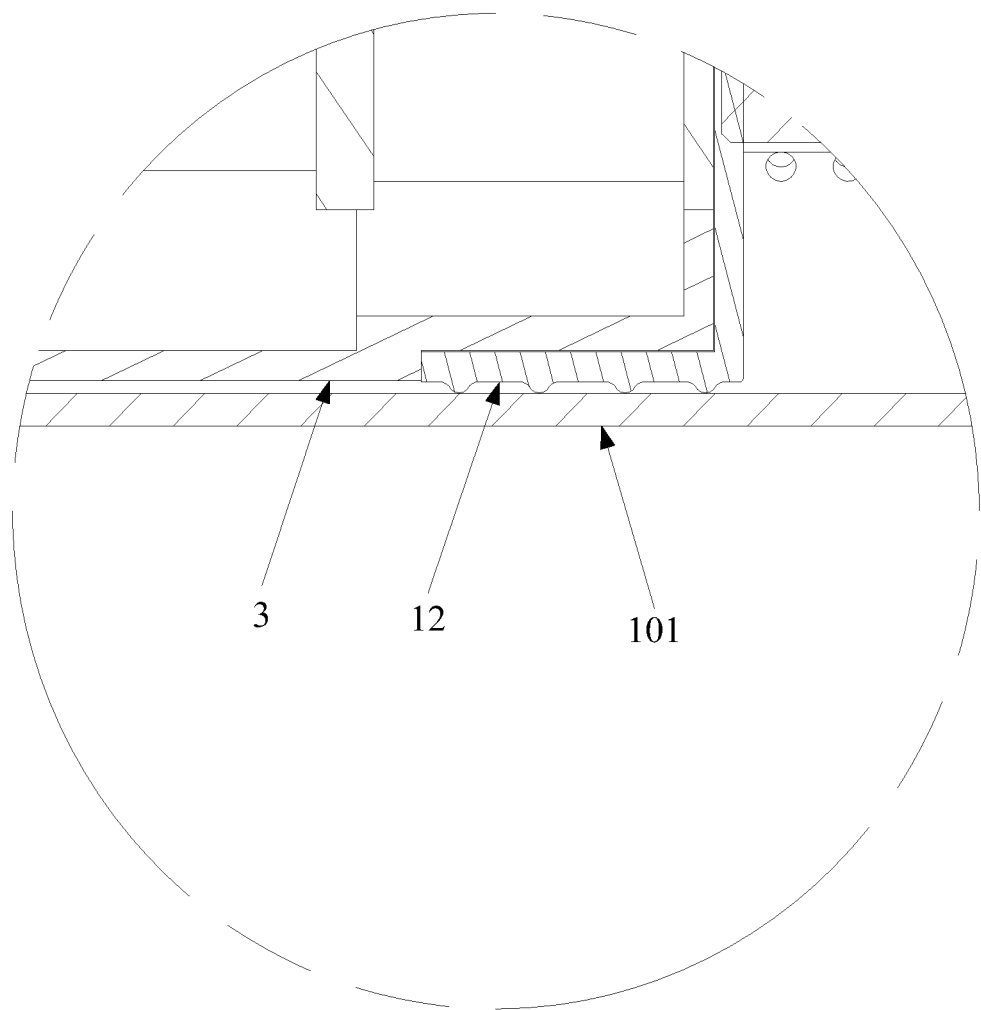
FIG. 6 is a partially enlarged view of FIG. 5.

The electronic device of the present embodiment may further include one or more elastic sleeves 12 disposed on the outer side of the first multimedia output module 3 such that an outer wall of the elastic sleeve 12 may protrude from an outer wall of the first multimedia output module 3, and the outer wall of the elastic sleeve 12 may be in contact with an inner wall of the housing, as shown in FIG. 6. Therefore, the first multimedia output module 3 may be suspended in the inner cavity of the housing through the elastic sleeve 12. As such, the elastic sleeve 12 may function as a shock absorber and a buffer, and at the same time function as a support, a connection, and a fastener.

As shown in FIG. 1, FIG. 2, FIG. 4, and FIG. 5, the functional mechanisms in the rotary shaft module mentioned above may include: a first rotary shaft mechanism 1; a second rotary shaft mechanism 2 coaxially disposed with the first rotary shaft mechanism 1 and the length of the second rotary shaft mechanism 2 may be different from the length of the first rotary shaft mechanism 1, where the first rotary shaft mechanism 1 may include a first housing 101, the second rotary shaft mechanism 2 may include a second housing 201, and the difference in length may be mainly manifested in that the length of the first housing 101 may be different from the length of the second housing 201. In the present embodiment, the asymmetric setting may be embodied only by the asymmetry of the arrangement positions mentioned above. However, in order to further highlight the arrangement of the asymmetric setting and for the better assembly with the first multimedia output module 3, the functional mechanisms may have different lengths. That is, the length of the first rotary shaft mechanism 1 may be different from the length of the second rotary shaft mechanism 2, which may be manifested in the difference in length of their respective housings. As such, the asymmetric setting may be embodied both in the arrangement positions of the functional mechanisms and the structures of the functional mechanisms.

The functional mechanisms including the first rotary shaft mechanism 1 and the second mechanism 2 is an embodiment of the present disclosure, and the number of rotary shaft mechanisms may be more, which is not limited in the present disclosure.

Since the lengths of the first rotary shaft mechanism 1 and the second rotary shaft mechanism may be different, the length of the first rotary shaft mechanism 1 may be greater than the length of the second rotary shaft mechanism 2, or the length of the second rotary shaft mechanism 2 may be greater than the length of the first rotary shaft mechanism 1. Further, since the first multimedia output module 3 may be disposed on the rotary shaft mechanism with a greater length, the first multimedia output module 3 may be disposed on the first rotary shaft mechanism 1 or may be disposed on the second rotary shaft mechanism 2. In one embodiment, the length of the first housing 101 may be greater than the length of the second housing 201, and the first multimedia output module 3 may be assembled with the first rotary shaft mechanism 1. That is, the first multimedia output module 3 may be disposed in the inner cavity of the first housing 101.

In addition, the first multimedia output module 3 may be disposed not only on the first rotary shaft mechanism 1 with a greater length, but also on the second rotary shaft mechanism 2 with a less length. Or, there may be a plurality of first multimedia output modules 3 disposed on both rotary shaft mechanisms. When there is a plurality of first multimedia output modules 3, the first multimedia output modules 3 may be of the same type, for example, all speaker or all display screens that will be mentioned later. Alternatively, the first multimedia output modules 3 may be of different types, such as one or a part may be a speaker, and another one or another part may be a display screen or the like.

Further, when there are two or more rotary shaft mechanisms, the plurality of first multimedia output modules 3 may be freely arranged on the plurality of rotary shaft mechanisms. For example, three rotary shaft mechanisms may be provided with speakers or display screens, or one may be provided with a speaker, and the other two may be provided with display screens or the like. Furthermore, on the basis of having speakers provided on the three rotary shaft mechanisms, it may be also possible to make the speaker on the left side as a left channel speaker, the speaker on the right side as a right channel speaker, and the speaker in the middle as a subwoofer or the like.

In one embodiment, the first rotary shaft mechanism 1 may be a two-axis synchronous mechanism that may invert the first main body 15 and the second main body 16 relative to each other by 360°. Similarly, the second rotary shaft mechanism 2 may be a two-axis synchronous mechanism that may invert the first main body 15 and the second main body 16 relative to each other by 360°. Further, two rotary shafts in one of the first rotary shaft mechanism 1 and the second rotary shaft mechanism 2 disposed coaxially may be coaxially disposed in a one-to-one manner with the two rotary shafts in the other rotary shaft mechanism.

More specifically, a first end of the first rotary shaft mechanism 1 may be connected to the first main body 15 and the second main body 16. A second end of the second rotary shaft mechanism 2 may be connected to the first main body 15 and the second main body 16. The connection position may be a portion where a connecting plate 13 may be disposed as shown in FIGS. 1, 2, 4, and 5. On the basis of asymmetric setting, this arrangement further defines the connection position of the two rotary shaft mechanisms with the first main body 15 and the second main body 16. That is, the connection positions of the first rotary shaft mechanism 1 and the second rotary shaft mechanism 2 with the main body (including the first main body 15 and the second main body 16) may be symmetrical. More specifically, a first end of the first rotary shaft mechanism 1 may be the end of the two ends further away from the second rotary shaft mechanism 2 (which may be referred to as the A end); a second end of the first rotary shaft mechanism 1 may be the end of the two ends closer to from the second rotary shaft mechanism 2 (which may be referred to as the B end); a first end of the second rotary shaft mechanism 2 may be the end of the two ends closer to the first rotary shaft mechanism 1 (which may also be referred to as the A end); and a second end of the second rotary shaft mechanism 2 may be the end of the two ends further away from the first rotary shaft mechanism 1 (which may also be referred to as the B end). The arrangement mentioned above may be the AB-AB arrangement, and the connecting ends of the first rotary shaft mechanism 1 and the second rotary shaft mechanism 2 to the main body may respectively be a B end and an A end. The two ends may be located at both ends of the overall structure of the connecting device, which may be symmetrical about the center of the connecting device.

In one embodiment, based on the symmetrical structure of the connecting ends, the connecting device may further include a connecting module. The connecting module 5 may be connected to the second end (B end) of the first rotary shaft mechanism 1 and the first end (A end) of the second rotary shaft mechanism 2, i.e., between the first rotary shaft mechanism 1 and the second rotary shaft mechanism 2 as shown in FIGS. 1, 2, 4, 5, 7, and 8. The connecting module 5 may specifically include: a first connector 501 that may be connected to the second end of the first housing 101; a second connector 502 that may be connected to the first end of the second housing 201; a first support 503 that may be rotatably connected to the first connector 501 and the second connector 502, and fixedly connected to the first main body 15; and a second support 504 that may be rotatably connected to the first connector 501 and the second connector 502, and fixedly connected to the second main body 16. In this arrangement, the first connector 501 and the second connector 502 may be respectively connected to the first housing 101 and the second housing 201, and the first support 503 and the second support 504 may be identical in their arrangement, that is, the two ends may be respectively connected to the first connector 501 and the second connector 502, and may be rotated relative to the first connector 501 and the second connector 502. Further, in this arrangement, the first support 503 and the second support 504 may be different in that the first support 503 may be used to fixedly connecting with the first main body 15, and the second support 504 may be used to fixedly connecting with the second main body 16. Since the connecting device may be distributed over an entire first sidewall and an entire second sidewall, the length of the first rotary shaft mechanism 1 (more specifically, the first housing 101) may be greater. During the rotation of the connecting device, the first housing 101 may be shaken due to machining and assembly errors, and the speaker disposed inside the first housing 01 may also cause vibration of the first housing 101 while outputting sound. In order to prevent this situation and improve operational stability, the connecting module 5 may be disposed between the first rotary shaft mechanism 1 and the second rotary shaft mechanism 2. The connecting module 5 not only realizes the connection between the first rotary shaft mechanism 1 and the second rotary shaft mechanism 2, but also connects its connecting ends with the first main body 15 and the second main body 16, thereby realizing the fixing of the connecting ends. In addition, if the situation mentioned above is not considered, the connecting module 5 may not be included, and the first rotary shaft mechanism 1 and the second rotary shaft mechanism 2 may be directly connected.

Figure 4:
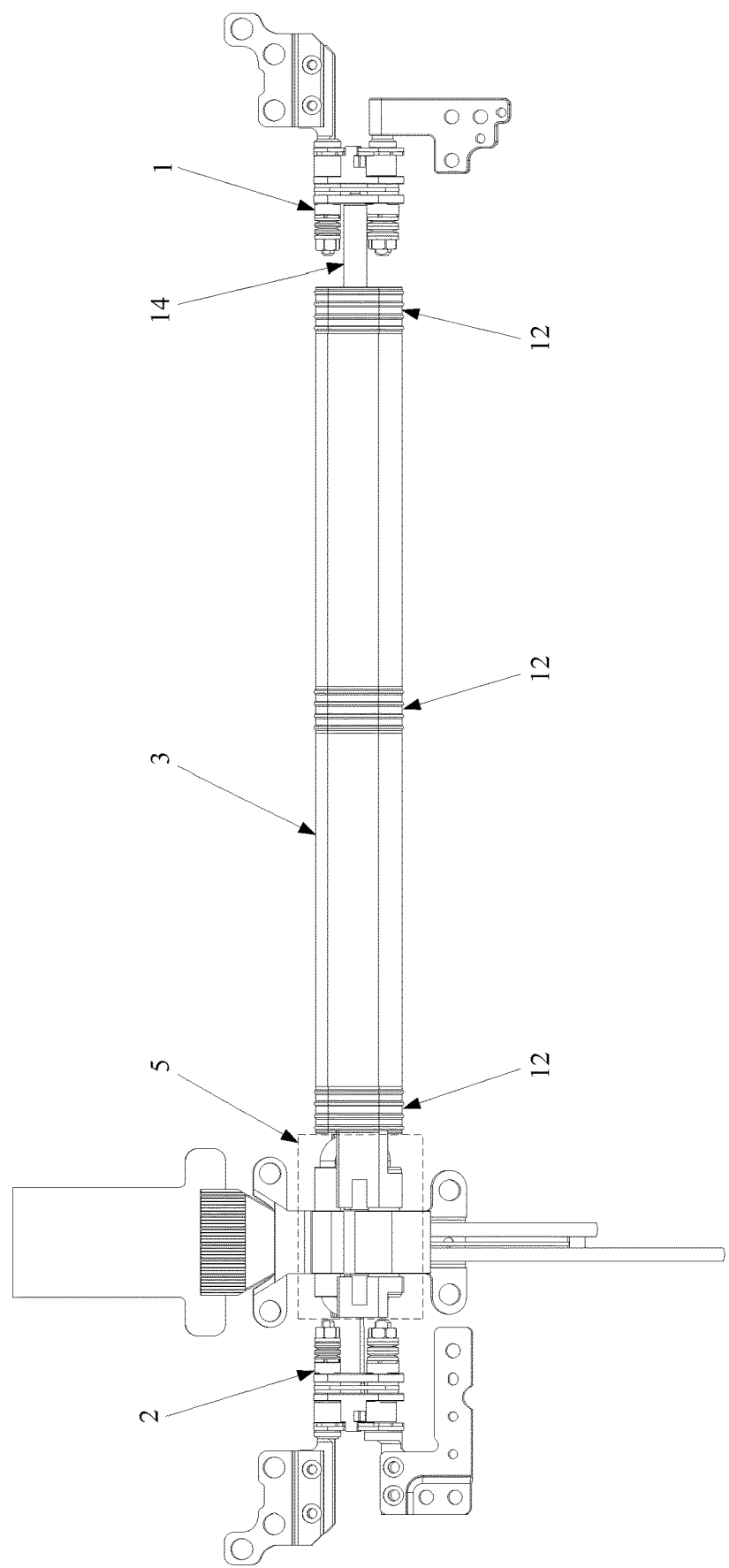
FIG. 4 is a schematic structural view of the first multimedia output module combined with a rotary shaft mechanism and a connecting module according to an embodiment of the present disclosure.
Figure 8:
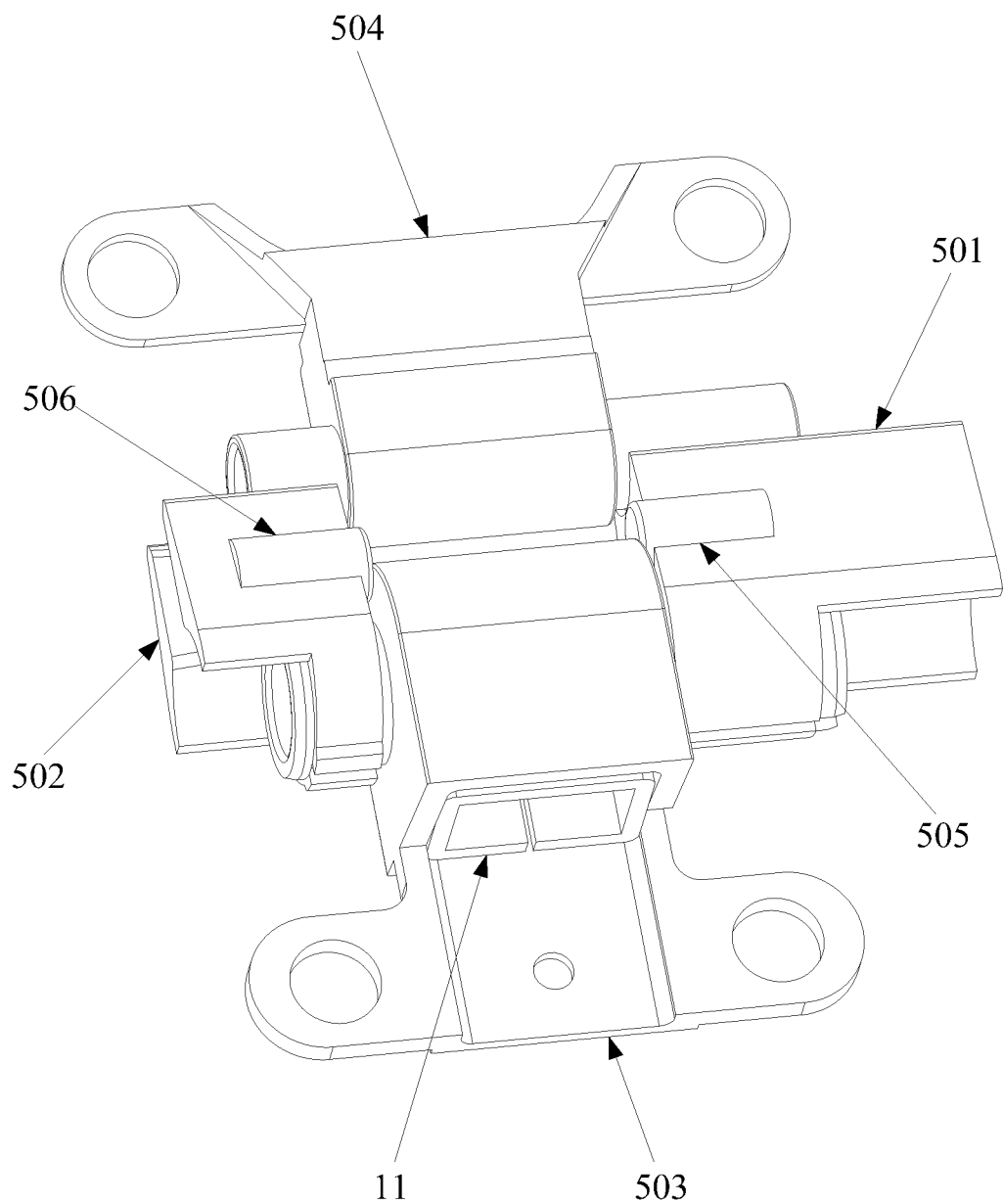
FIG. 8 is a schematic structural view of a connection module according to an embodiment of the present disclosure.
Figure 9:
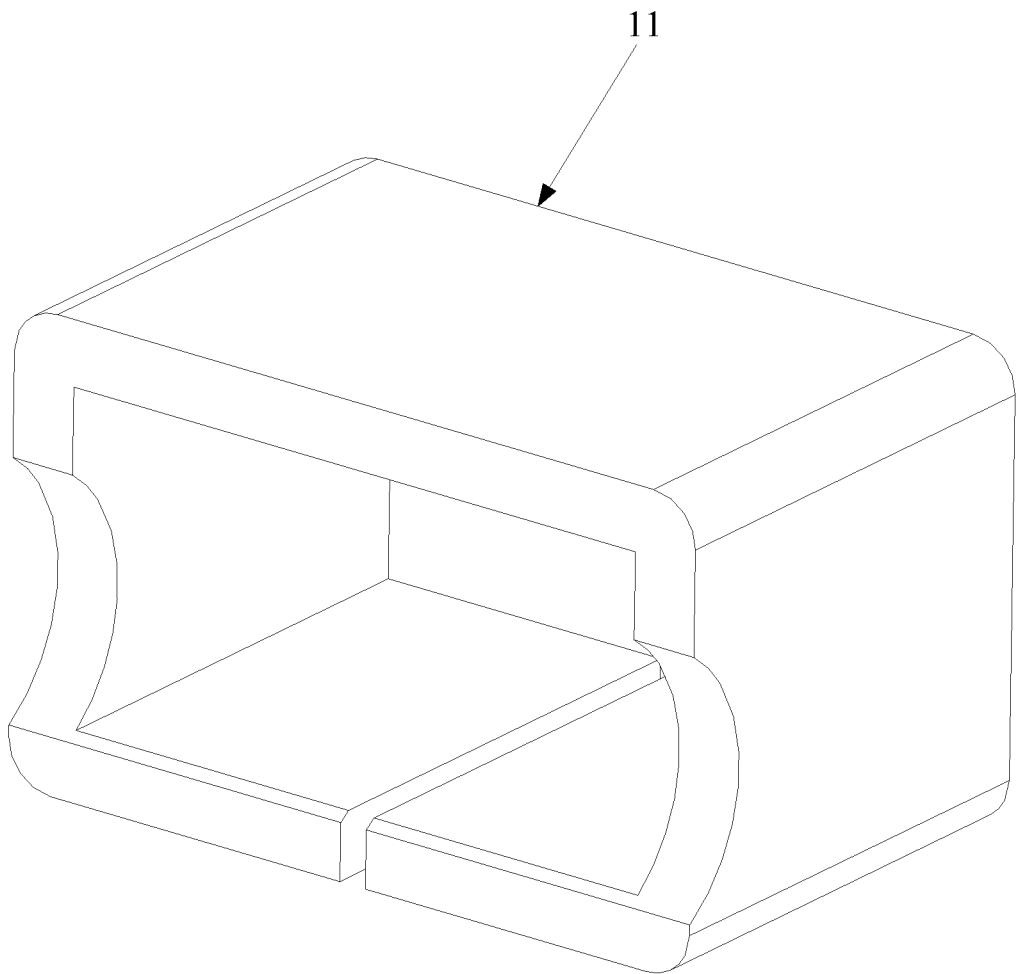
FIG. 9 is a schematic view illustrating the structure of a retaining ring according to an embodiment of the present disclosure.

Further, the first connector 501 may include a first protrusion 505 protruding from the surface of the first connector 501 for contacting the inner wall of the first housing 101, and second connector 502 may include a second protrusion 506 protruding from the surface of the second connector 502 for contacting the inner wall of the second housing 201, as shown in FIG. 4 and FIG. 8. Since the first support 503 and the second support 504 need to rotate relative to the first connector 501 and the second connector 502, the first protrusion 505 and the second protrusion 506 may be used to provide a larger installation space between the first housing 101 and the first connector 501, and between the second housing 201 and the second connector 502. This arrangement may prevent the first housing 101 and the first connector 501, and the second housing 201 and the second connector 502 from rubbing against the rotating first support 503 and the second support 504 due to the close fit. Further, this arrangement may also avoid wear of the first support 503 and the second support 504, and the generation of noise. Furthermore, this arrangement may also allow the first support 503 and the second support 504 to rotate more smoothly with respect to the first connector 501 and the second connector 502.

In the structure mentioned above, the first protrusion 505 and the first connector 501 may be integrally formed, and the second protrusion 506 and the second connector 502 may be integrated, and they may be made of polyoxymethylene. The integral structure may further improve the fastness of the connection, and polyoxymethylene may have better wear resistance, which may not only improve the connection effect of the first housing 101 and the first connector 501, and the second housing 201 and the second connector 502, but may also make the rotational connection of the first support 503 and the second support 504 to the first connector 501 and the second connector 502 more reliable.

In one embodiment, on the basis of having the connecting module 5, wiring may be realized through the connecting module 5.

In conventional technology, the wiring of laptop is realized through the rotary shaft. However, this wiring method may not be applicable to the electronic device provided in the present embodiments. Therefore, based on the new arrangement method of using two rotary shaft mechanisms, one of the two rotary shaft mechanisms being longer, and a connecting module 5 located between the two rotary shaft mechanisms, a wiring method may be realized through the connecting module 5. In addition, the new wiring method realized through the connecting module 5 may not only include a wiring direction from the first main body 15 to the second main body 16, but may also include a wiring direction from the first main body 15 to the first multimedia output module 3.

Figure 7:
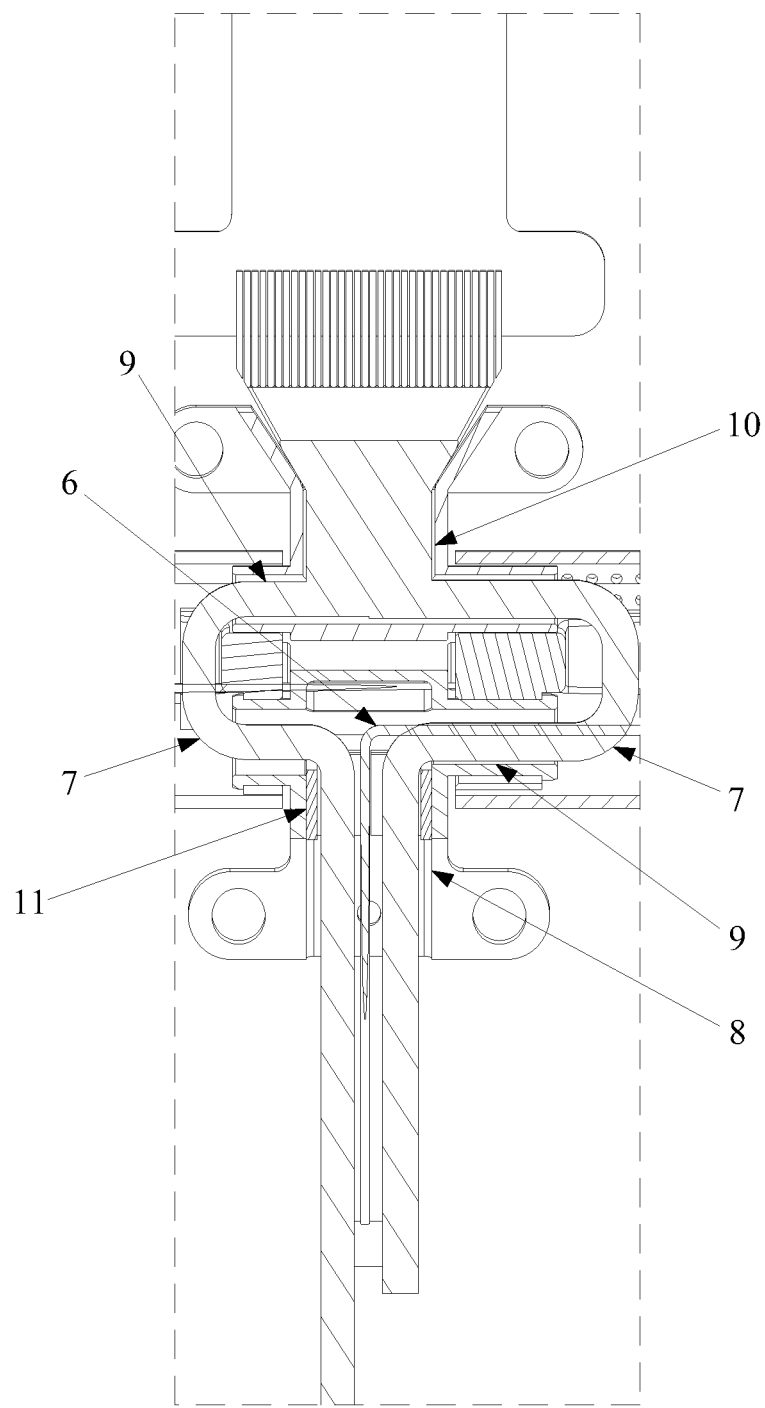
FIG. 7 is a schematic structural view of the connecting module of FIG. 5 mated with a first wire and a second wire according to an embodiment of the present disclosure.

More specifically, the connecting module 5 may include a wiring channel for arranging wires. As shown in FIG. 7, the wiring channel may include a first wiring channel for arranging a first wire 6 and a second wiring channel for arranging a second wire 7. The first wire 6 may be used for communicatively connecting the first main body 15 and the first multimedia output module 3, and the second wire 7 may be used for communicatively connecting the first main body 15 and a second multimedia output module disposed on the second main body 16. In one embodiment, the types of the first multimedia output module 3 and the second multimedia output module may be different. For example, the first multimedia output module 3 may be a speaker for outputting sound as described above, and the second multimedia output module may be a display screen for displaying images and videos. In another embodiment, the display screen may be the display screen of the electronic device (when the electronic device is a laptop, the display screen may be the display screen on the display portion). Of course, the first multimedia output module 3 and the second multimedia output module may also be of the same type, for example, both they may both be display screens and the like. In addition, regardless of whether the first multimedia output module 3 and the second multimedia output module are of different types or the same type, the wires connected thereto (e.g., the first wire 6 and the second wire 7) may be the same type of wires, for example, the wires may both be USB cables. Further, the wires may be of different types of wires with different thickness for different types of data transmission. That is, the types of wires disposed in the first wiring channel and the second wiring channel may be the same or different.

As shown in FIGS. 7 and 8, in the channel structure mentioned above, the second wiring channel may include: a wire inlet channel 8 that may be disposed on the first support 503; a wire outlet channel 10 that may be disposed on the second support 504; and a connecting channel 9 that may be disposed on the first connector 501 and/or the second connector 502 for connecting the wire inlet channel 8 and the wire outlet channel 10. In the embodiment where the second multimedia output module may be the display screen of the electronic device, the second wire 7 passing through the second wiring channel may be a video connecting wire, which may come out of the first main body 15 and subsequently pass through the wire inlet channel 8, the connecting channel 9, the wire outlet channel 10, and then enter the second main body 16. Further, since the amount of data to be transmitted may be relatively large, if one wire is used to transmit the data, the cross-sectional area of the second wire 7 may be large (i.e., the second wire 7 may be thick), and it may be difficult to pass through the wiring channel. Therefore, in one embodiment, two wires each having a relatively small cross-sectional area may be used to realize the transmission of video data. Based on the above description, the connecting channel 9 may be respectively disposed on the two connectors to respectively arrange the two wires, and the wire inlet channel 8 and the wire outlet channel 10 may both be T-shaped channels that may communicate with the two connecting channels 9 as shown in FIG. 7.

The first wiring channel may include: a first channel segment that may be disposed on the first connector 501; and a second channel segment that may be the wire inlet channel 8 disposed on the first support 503 and in communication with the first channel segment, where the first channel segment may be a wiring channel disposed on the outer wall of the first connector 501. The first wiring channel may be used for arranging the thinner wires for communicatively connecting the first multimedia output module 3 and the first main body 15. In order to save space and facilitate the arrangement of the wires, in one embodiment, the second channel segment may be the wire inlet channel 8 disposed on the first support 503. That is, the first wiring channel may share a portion of the channel with the second wiring channel. In particular, a portion of the first wire 6 just coming out of the first main body 15 and the second wire 7 may enter the wire inlet channel 8 together to realize effect wiring. Since there may not be a wiring channel on the first connector 501 for arranging the first wire 6 and the second wire 7 may completely occupy the space of the connecting channel 9 disposed on the first connector 501, therefore, it may be necessary to specifically dispose the first channel segment on the first connector 501. Further, since the connecting channel 9 may already occupy most of the volume of the first connector 501, in order to arrange the first wire 6 more reasonably, the first channel segment may be an elongated wiring channel disposed on the outer wall of the first connector 501, and the first wire 6 may be secured in the elongated wiring channel. When the first wire 6 is arranged, it may first pass through the wire inlet channel 8, then it may enter the wiring channel, and it may finally enter into the inner cavity of the first housing 101 through the wiring channel to be connected with the first multimedia output module 3.

In order to ensure the reliability of the wiring of the first wire 6, a training ring 11 may be disposed in the second channel segment (i.e., in the wire inlet channel 8). An outer wall of the retaining ring 11 may be attached to an inner wall of the wire inlet channel 8 as shown in FIGS. 5, 7, 8, and 9. The first wire 6 and the second wire 7 may both pass through the retaining ring 11 and then enter the first channel segment and the connecting channel 9, respectively. Further the first wire 6 may pass through the retaining ring 11 before entering the first channel segment and block the first wire 6 through the retaining ring 11 to prevent the first wire 6 from coming out of the first channel segment to the outside of the first connector 501.

In addition, in one embodiment, the retaining ring 11 may be made of a rubber material, which may be capable of isolating the first wire 5 and the second wire 7 from the inner wall of the wire inlet channel 8 while blocking the first wire 6, thereby avoiding the first wire 6 and the second wire 7 from rubbing against the inner wall of the wire inlet channel 8 and causing abrasion.

Further, the first connector 501 and the second connector 502 may be respectively rotatably sleeved with a circular tube structure on the first support 503 and the second support through a circular sleeve structure, and a wire management slot may be disposed on the circular sleeve structure. The first wire 6 and the second wire 7 may both pass through the wire management slot to prevent the first wire 6 and the second wire 7 from rubbing against the apertures of the first connector 501 and the second connector 502 to causing damage to the wires.

When the first multimedia output module 3 is a display screen disposed outside the first housing 101, the first wire 6 may enter the inner cavity of the first housing 101 and then pass through the inner cavity.

Figure 3:
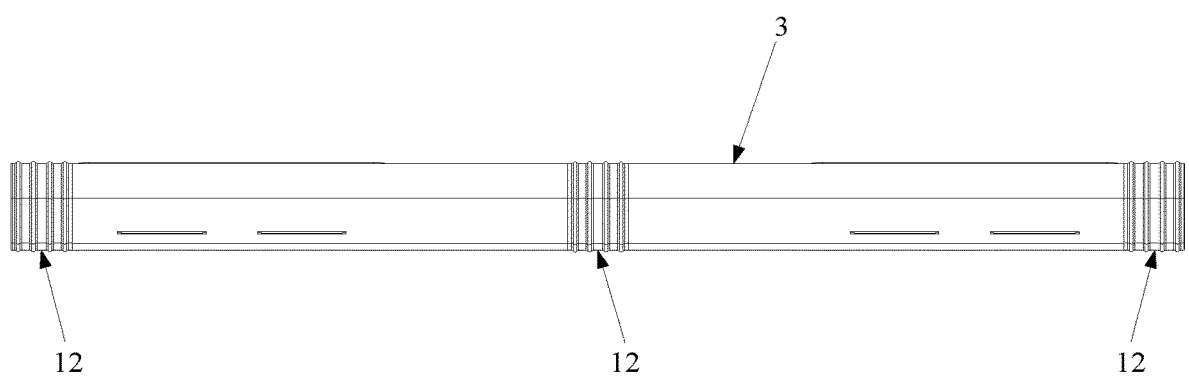
FIG. 3 is a schematic structural view of a first multimedia output module with an elastic sleeve according to an embodiment of the present disclosure.

As shown in FIGS. 3, 4, and 6, when the first multimedia output module 3 disposed on in the first housing 101 is a speaker, in one embodiment, the speaker may have a cylindrical structure having an elliptical cross-sectional shape. Since the speaker may vibrate with producing sound, in order to prevent the vibration from affecting other components, the speaker may be connected and contacted with other components through the elastic sleeve 12. More specifically, a plurality of elastic sleeves 12 may be disposed. One of the elastic sleeves 12 may be disposed at a connecting portion between the connecting module 5 and the first multimedia output module 3. In particular, one end of the speaker may be inserted into the elastic sleeve 12, one end of the first connector 501 of the connecting module 5 may be inserted into the elastic sleeve 12, and the elastic sleeve 12 may be used to realize the elastic connection of the two. The elastic sleeve 12 may buffer the vibration of the speaker to provide the effect of buffering and shock absorption while providing the connection function at the same time.

The other elastic sleeves 12 may be sleeved on the outer side of the speaker and contact the inner wall of the first housing 101 as described above and shown in FIG. 6. These elastic sleeves 12 may serve as supports, connects, and fixes while providing shock absorption and buffering effect. In addition, since the elastic sleeve 12 connecting the speaker and the first connector 501 may also be sleeved on the outer wall of the speaker, it may also be in contact with the first housing 101 and function as a support, a connect, and a fixing.

More specifically, in one embodiment, there may be three elastic sleeves 12. One of the elastic sleeves 12 may be located at one end of the speaker to connect the speaker to the first connector 501, and another one of the elastic sleeves 12 may be located at the other end of the speaker in contact with the first housing 101 to provide support, connection, shock absorption, buffering, and fixing to the speaker. Further, the middle portion of the speaker may also have an elastic sleeve 12, which may also be in contact with the first housing 101 to provide the support, connection, shock absorption, buffering, and fixing effect.

In addition, the first housing 101 may be a tubular housing formed by joining two half-pipe segments. When the speaker is in contact with the first housing 101 through the elastic sleeves 12, in one embodiment, the elastic sleeves 12 may be in sealing contact with the speaker and the first housing 101, thereby reducing the occurrence of vibration through an air return space formed by the two adjacent elastic sleeves 12, the outer wall of the speaker, and the inner wall of the first housing 101.

As shown in FIGS. 4 and 5, when the end of the speaker near the connecting module 5 is flexibly connected to the first connector 501 through the elastic sleeve 12, the other end of the speaker away from the first connector 501, that is, the end near the first rotary shaft mechanism 1, may be connected to the first housing 101 through the elastic sleeve 12, and it may be connected to the first rotary shaft mechanism 1 through a connecting rod 14. One end of the connecting rod 14 may be connected to the first rotary shaft mechanism 1 and the other end of the connecting rod 14 may abut on the end of the speaker. In the arrangement of the connecting rod 14 connecting to the first rotary shaft mechanism 1 and the elastic sleeve 12 connecting the connecting module 5, not only the connecting rod 14 may better realize the stable installation of the speaker, the flexible connection at one end of the speaker may also ensure the normal vibration of the speaker. As such, the connection effect and the working effect of the speaker may be well taken care of.

The structures of the various parts are described in a progressive manner in this description. The structure of each of the parts is mainly focused on describing its differences from the prior art structure, and the overall and partial structure of the electronic device may be obtained by combining the structures of the various parts.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An electronic device comprising:
    a first main body including a first side portion;
    a connecting device connected to the first side portion of the first main body, the connecting device including a connecting module and a functional component, the functional component including: a first rotary shaft mechanism having a first housing, and a second rotary shaft mechanism having a second housing, wherein: the second rotary shaft mechanism is connected to the first rotary shaft mechanism through the connecting module and coaxially disposed with the first rotary shaft mechanism, a length of the second rotary shaft mechanism is different from a length of the first rotary shaft mechanism, and a length of the first housing is different from a length of the second housing;
    a second main body including a second side portion coupled to the first side portion, the second side portion is connected to the connecting device such that the second main body is movable relative to the first main body to form a first angle between the first main body and the second main body or a second angle different from the first angle; and
    a first multimedia output module disposed on the connecting device and communicatively connected to the first main body or the second main body, wherein the first multimedia output module is disposed in a cavity of the first housing;
    wherein:
        a first end of the first rotary shaft mechanism is connected to the first main body and the second main body, and a second end of the second rotary shaft mechanism is connected to the first main body and the second main body;
        the connecting module covers a plurality of wires and connects a second end of the first rotary shaft mechanism and a first end of the second rotary shaft mechanism; and
        the connecting module includes:
            a first connector connected to a second end of the first housing;
            a second connector connected to a first end of the second housing;
            a first support rotatably connected the first connector and the second connector and connected to the first main body; and
            a second support rotatably connected the first connector and the second connector and connected to the second main body, the first support or the second support is connected to the first multimedia output module through an elastic sleeve.

2. The electronic device of claim 1, wherein
    the first main body is of a plate-like shape including a first surface opposite to a second surface, and the first side portion is a side region of the plate-like shape;
    the second main body is of a plate-like shape including a third surface opposite to a fourth surface, and the second side portion is a side region of the plate-like shape;
    the first angle is an angle between a first reference surface and a second reference surface, the first reference surface is a plane between the first surface and the second surface, and the second reference surface is a plane between the third surface and the fourth surface; and
    the second angle is an angle between a first reference surface and a second reference surface, the first reference surface is a plane between the first surface and the second surface, and the second reference surface is a plane between the third surface and the fourth surface.

3. The electronic device of claim 1, wherein:
    the first housing includes an opening configured to communicate with an inner cavity of the first housing for outputting media information outputted by the first multimedia output module.

4. The electronic device of claim 3, wherein the first multimedia output module is an audio output module; and the electronic device includes one or more elastic sleeves that are sleeved on the first multimedia output module and in contact with an inner wall of the first housing.

5. The electronic device of claim 1, wherein the connecting device is disposed offset from a midpoint of the first side portion or the second side portion.

6. The electronic device of claim 1, the connecting device is symmetrically disposed with respect to the midpoint of the first side portion or the second side portion, and the functional component of the connecting device is asymmetrically disposed with respect to the midpoint of the first side portion or the second side portion.

7. The electronic device of claim 1, wherein the connecting module includes a wiring channel for arranging the wires; the wiring channel includes a first wiring channel for arranging a first wire and a second wiring channel for arranging a second wire; the first wire communicatively connects the first main body and the first multimedia output module; and the second wire communicatively connects the first main body and a second multimedia output module disposed on the second main body.

8. The electronic device of claim 7, wherein the second wiring channel includes:
    a wire inlet channel disposed on the first support, a wire outlet channel disposed on the second support; and
    a connecting channel disposed on the first connector or the second connector for connecting the wire inlet channel and the wire outlet channel.

9. The electronic device of claim 8, wherein the first wiring channel includes:
    a first channel segment disposed on the first connector; and
    a second channel segment being connected to the first channel segment, the second channel segment being the wire inlet channel.

10. The electronic device of claim 9, wherein the first channel segment is a wiring channel disposed on an outer wall of the first connector and a retaining ring is disposed in the second channel segment, the second wire passes through the retaining ring.

* * * * *